United States Patent
Yiu et al.

(10) Patent No.: US 10,621,257 B2
(45) Date of Patent: Apr. 14, 2020

(54) REGION OF SEARCH BASED ON CONTEXT

(71) Applicant: Oath Inc., New York, NY (US)

(72) Inventors: Paul Yiu, Mountain View, CA (US);
Naroo Krishnan, Sunnyvale, CA (US);
Suju Rajan, Sunnyvale, CA (US)

(73) Assignee: Oath Inc., New York, NY (US)

( * ) Notice: Subject to any disclaimer, the term of this patent is extended or adjusted under 35 U.S.C. 154(b) by 503 days.

(21) Appl. No.: 14/866,382

(22) Filed: Sep. 25, 2015

(65) Prior Publication Data
US 2017/0091202 A1 Mar. 30, 2017

(51) Int. Cl.
*G06F 16/9537* (2019.01)

(52) U.S. Cl.
CPC ............... *G06F 16/9537* (2019.01)

(58) Field of Classification Search
CPC ......... G06F 17/30905; G06F 17/30864; G06F 17/30398; G06F 17/3064; G06F 17/30761; G06F 17/3087; G06F 17/3097; G06F 3/0236; G06F 16/9537
USPC ............ 707/722, 728, 748, 769; 705/26, 37
See application file for complete search history.

(56) References Cited

U.S. PATENT DOCUMENTS

| | | | |
|---|---|---|---|
| 2008/0215475 A1* | 9/2008 | Ramer | G06F 17/30867 705/37 |
| 2010/0076994 A1* | 3/2010 | Soroca | G06F 17/30749 707/769 |
| 2011/0184768 A1* | 7/2011 | Norton | G06Q 10/02 705/5 |
| 2012/0023088 A1* | 1/2012 | Cheng | G06F 17/3087 707/707 |
| 2013/0085861 A1* | 4/2013 | Dunlap | G01S 19/34 705/14.58 |
| 2017/0067750 A1* | 3/2017 | Day | G01C 21/3461 |

* cited by examiner

*Primary Examiner* — Dung K Chau
(74) *Attorney, Agent, or Firm* — Cooper Legal Group, LLC (57) ABSTRACT

Techniques are described by which information needs are satisfied by taking into account a variety of contextual cues that constrain the information searched. Contextual data such as the location, speed, and direction of travel of a mobile device are used to generate or modify a search query in a way that constrains the geographic region being searched to improve the relevance of search results or recommendations provided.

20 Claims, 7 Drawing Sheets

REGION OF SEARCH BASED ON CONTEXT

BACKGROUND

The ubiquity of mobile devices has revolutionized the way in which consumers discover and connect with sources of goods and services. For example, using the local search functionality of a mobile app (e.g., a map app), a mobile device user can express a need with varying levels of specificity and be shown nearby options for meeting that need. The user might say "I'm hungry," or enter "Chinese food" in a search query text box. The former query will typically result in a wide range of nearby food options including restaurants, fast food, grocery stores, etc. The latter query will typically result in a much narrow range of options appropriate to the type of cuisine specified. In either case, however, the available options are primarily selected based on a distance radius from the user's location. In some cases, the user might be given the option of increasing or decreasing the radius so as to correspondingly expand or reduce the set of available options. However, there are situations in which the use of a radius from the user's location does not capture the most relevant options.

SUMMARY

Various implementations are described in which contextual information is used to constrain information being search. According to a particular class of implementations, methods, apparatus, devices, and computer program products are provided according to which an information need for a user of a device is identified. Contextual data is identified including a current location, direction of travel, and speed of the device. A search query is constructed based on the information need and using the contextual data. The search query corresponds to a geographical search region constrained by the current location, direction of travel, and speed of the device. The search query is processed to generate search results responsive to the information need, and the search results are transmitted to the device for presentation.

According to another class of implementations, methods, apparatus, devices, and computer program products are provided according to which a user-generated search query is received from a device expressing an information need of a user of the device. Contextual data representing a real-time context of the device is identified. A modified search query is constructed based on the information need and using the contextual data. The modified search query corresponds to a geographical search region constrained by at least some of the contextual data. The search query is processed to generate search results responsive to the information need, and the search results are transmitted to the device for presentation.

According to another class of implementations, methods, apparatus, devices, and computer program products are provided according to which a communication representing an information need of a user of a device is transmitted to a remote platform. Contextual data is generated including a current location, direction of travel, and speed of the device. The contextual data is transmitted to the remote platform. Search results are received that are responsive to a search query constructed based on the information need and the contextual data, and corresponding to a geographical search region constrained by the current location, direction of travel, and speed of the device. The search results are presented on the display of the device.

A further understanding of the nature and advantages of various implementations may be realized by reference to the remaining portions of the specification and the drawings.

DETAILED DESCRIPTION

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

This disclosure describes techniques by which information needs may be satisfied by taking into account a variety of contextual data that constrain the information searched to provide more relevant information than conventional techniques. An information need might be represented by a search query that is explicitly expressed by a user. Alternatively, an information need might be inferred or derived from a variety of data including, for example, some of the contextual data including, for example, user profile information. According to one class of implementations, contextual data such as the location, speed, and direction of travel (and in some cases, the destination) of a mobile device is used to generate or modify a search query in a way that constrains the geographic region being searched to improve the relevance of search results or recommendations provided. An example may be instructive.

Figure 1:
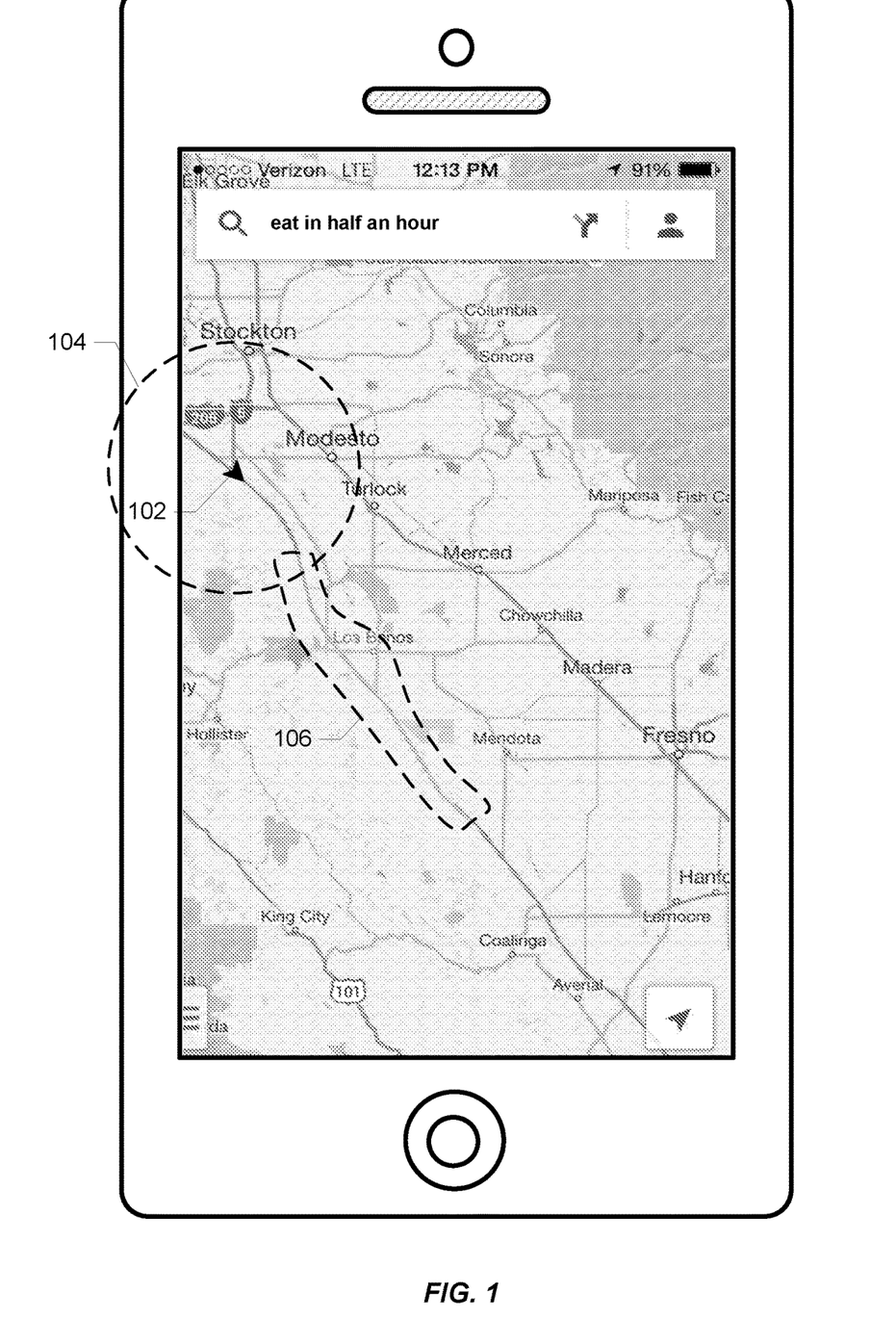
FIG. 1 is an example of a user interface illustrating operation of a particular implementation.

FIG. 1 shows a map interface displayed on the screen of a mobile device. In the depicted example, the user of the mobile device is a passenger in a vehicle heading south on Interstate 5 in Central California (as indicated by icon 102) and has entered the search query "eat in half an hour," e.g., either verbally or using a virtual keyboard. Conventional search techniques would select a radius from the vehicle's current location, ignoring important contextual information, and include irrelevant search results such as, for example, restaurant options the vehicle has already passed, as well as options near adjacent highways that are not part of the vehicle's route (e.g., restaurants in Stockton or Modesto as encompassed by circular search region 104). This is further exacerbated by the fact that the current location of the vehicle (i.e., at 12:13 pm) is not where the vehicle will be in half an hour, i.e., at 12:43 pm.

By contrast, the techniques described herein account for a variety of contextual information to provide highly relevant options for identified information needs. In the example of FIG. 1, the user's search query is modified with reference to the vehicle's location at 12:13 pm, the speed of the vehicle, and the direction of travel such that the geographic region of the search is constrained as illustrated by search region 106. That is, because the vehicle is on I-5 heading south at an average speed of 70 miles per hour, the geographic region of search is constrained to a corridor around the highway that includes the vehicle's projected location at the specified time. As illustrated, such a region might include a slight widening to account for possible slight detours, e.g., at Los Banos. As will be appreciated, the relevance of the restaurant options provided relative to conventional techniques is likely very high. And it should be noted that the example shown is relatively simple. As will be discussed, the information that may be taken into account when generating/modifying the search query may vary considerably in its complexity and the manner in which it constrains the search region.

Figure 2:
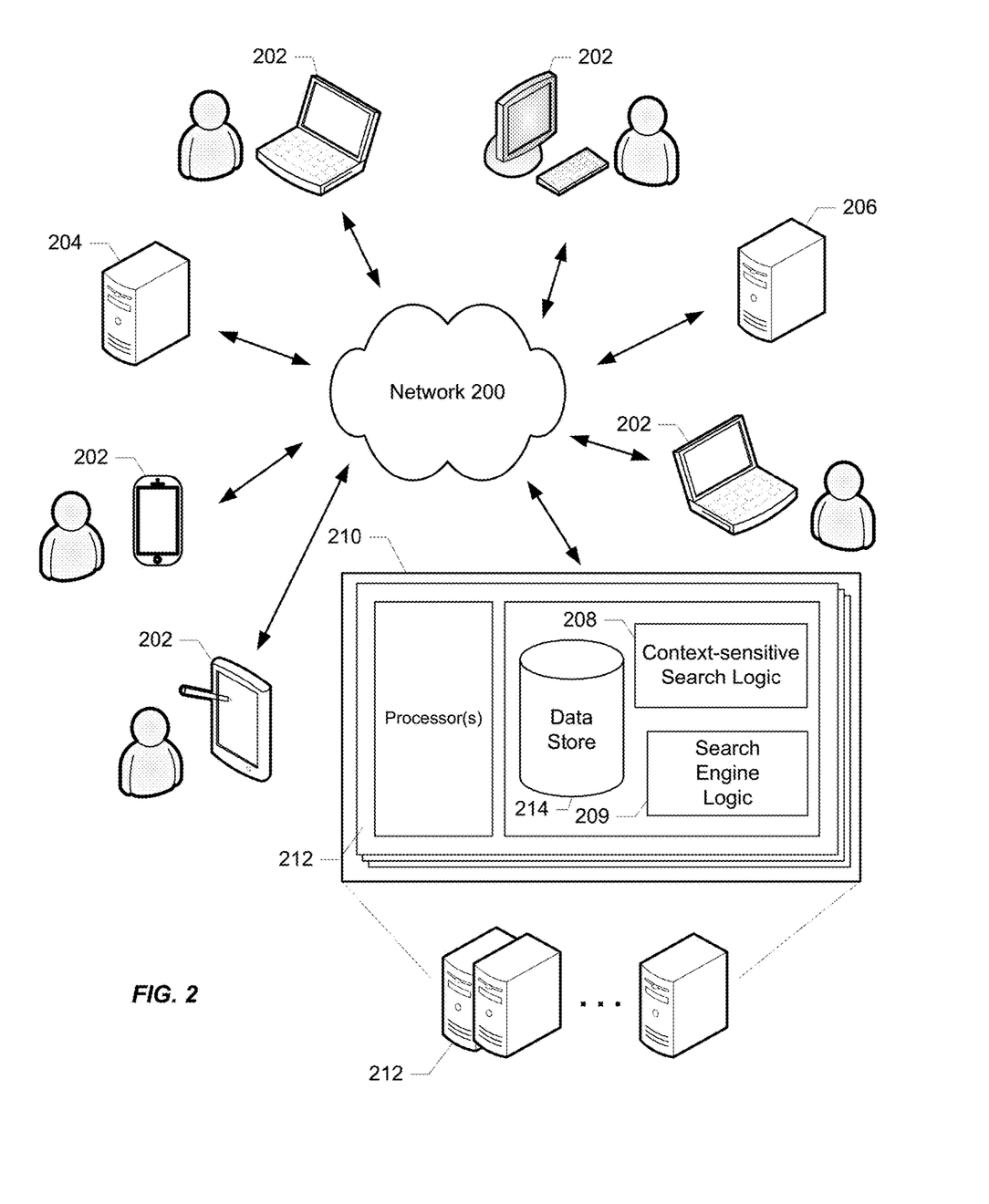
FIG. 2 is a simplified diagram of a computing environment in which various implementations may be practiced.

FIG. 2 shows a network environment in which techniques enabled by this disclosure may be implemented. The depicted network 200 may include any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. And while implementations are described herein primarily with reference to mobile devices, client devices 202 may be any device capable of connecting to network 200, and interacting with the great diversity of sites, networks, and systems interconnected by or integrated with network 200. Such devices include, but are not limited to, mobile devices (e.g., cell phones, smart phones, smart watches, tablets, etc.), personal computers (e.g., laptops and desktops), set top boxes (e.g., for cable and satellite systems), smart televisions, and gaming systems.

Context-sensitive information that satisfies express or implied information needs (e.g., search results, recommendations, etc.) may be presented on client devices 202 according to the techniques described herein in a variety of ways. For example, such information may be presented by a search app (or a search functionality within another app, e.g., a navigation app) as search results responsive to a search query that is explicitly formulated by a user. Alternatively, such information might be provided in response to an information need that is implicit, e.g., as recommendations in connection with use of a shopping app, a content delivery app, a restaurant recommendation app, etc. Moreover, information may accompany the presented information that explains the use of contextual information. For example, restaurant recommendations could be accompanied by the explanation, "Because you will be in San Mateo for dinner, here are some recommendations . . . " Thus, the user understands the contextual assumption underlying the recommendations. In view of the diversity represented by the foregoing examples, the scope of this disclosure should not be limited by reference to the specific examples described herein.

For the sake of clarity and simplicity, FIG. 2 and the following description assume an implementation in which the generation or modification of search queries as enabled by this disclosure (represented by context-sensitive search logic 208) is implemented as part of a search service platform 210 that retrieves and provides search results to client devices 202 for presentation (represented by search engine logic 209). As will be understood, platform 210 may conform to any of a wide variety of architectures such as, for example, a distributed platform deployed at one or more co-locations, each implemented with one or more servers 212. Data store 214 is also shown as part of platform 210 and may include, among other things, search results, user profile data, contextual data, etc. However, it should be noted that implementations are contemplated in which one or more of these functions or data sets operate or are stored remotely from the others (e.g., on other platforms such as servers 204 or 206), and/or are under the control of one or more independent entities (e.g., content providers, publishers, advertisers, etc.). And it should be noted that generating context-sensitive queries in connection with a search service is merely one example of the many types of services and/or content that may be provided as described herein. Any service that may be improved by understanding the context associated with an identified information need is within the scope of this disclosure.

It should also be noted that, despite references to particular computing paradigms and software tools herein, the logic and/or computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, any references to particular protocols herein are merely by way of example. Suitable alternatives known to those of skill in the art for all of these variations may be employed.

Figure 3:
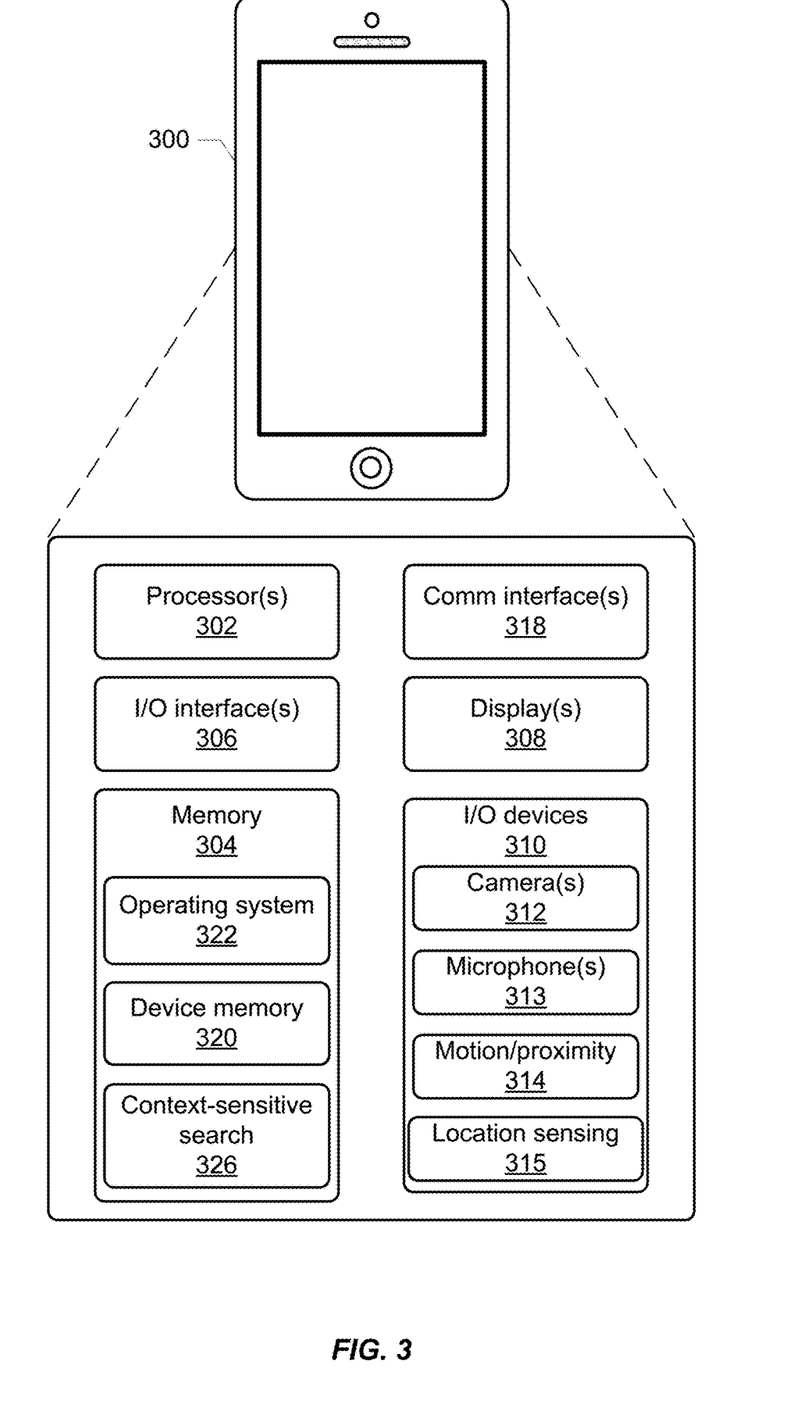
FIG. 3 is a simplified diagram of a computing device that may be used with various implementations.

FIG. 3 illustrates an example of client device (in this case a smart phone) that may be used with various implementations enabled by the present disclosure. Client device 300 includes (or has associated therewith) one or more processors 302 configured to execute stored instructions (e.g., in memory 304). Client device 300 may also include (or have associated therewith) one or more I/O interface(s) 306 to allow communication with one or more displays 308 and one or more I/O devices 310. I/O interface(s) 306 may include, for example, an inter-integrated circuit (I2C) interface, a serial peripheral interface (SPI) bus, a universal serial bus (USB), an RS-232 interface, a media device interface, etc. I/O device(s) 310 may include, for example, one or more cameras 312, one or more microphones 313, one or more motion/proximity sensors 314, one or more location sensors 315 (e.g., global positioning system, cell detection, etc.). The one or more displays 308 are configured to present search results, recommendations, and the like, as described herein and may comprise any of a variety of suitable display technology.

Client device 300 may also include one or more communication interfaces 318 configured to provide communications between client device 300 and other devices (e.g., remote servers). Such communication interface(s) 318 may be used to connect to cellular networks, personal area networks (PANs), local area networks (LANs), wide area networks (WANs), and so forth. For example, communications interfaces 318 may include RF modules for a 3G or 4G cellular network, a WiFi LAN, and/or a Bluetooth PAN. Client device 300 also includes one or more buses or other internal communications hardware or software (not shown) that allow for the transfer of data and instructions between the various modules and components of the system.

Memory 304 of client device 300 includes device memory 320 which includes non-transitory computer-readable storage media that may be any of a wide variety of types of volatile and non-volatile storage media including, for example, electronic storage media, magnetic storage media, optical storage media, quantum storage media, mechanical storage media, and so forth. Device memory 320 provides storage for computer readable instructions, data structures, program modules and other data for the operation of client device 300, as well as applications or apps with which context-sensitive information may be provided as described herein. It should be noted that the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 304 also includes at least one operating system (OS) module 322 configured to manage hardware resources such as I/O interfaces 306 and provide various services to applications, apps, or modules executing on processor(s) 302. As will be appreciated, memory 304 may include a variety of other modules that are not depicted for the sake of clarity. Device memory 304 may also include logic (context-sensitive search module 326) responsible for at least some aspects of the techniques described herein. For example, logic 326 may be part of an app on client device 300 that generates and/or collects various contextual data that may be used to provide context-sensitive search services. More generally, implementations are contemplated in which various aspects of the techniques enabled by this disclosure may be performed on the client device and/or on one or more remote platforms with which the client device communicates (e.g., search services platform 210 of FIG. 2).

Figure 4:
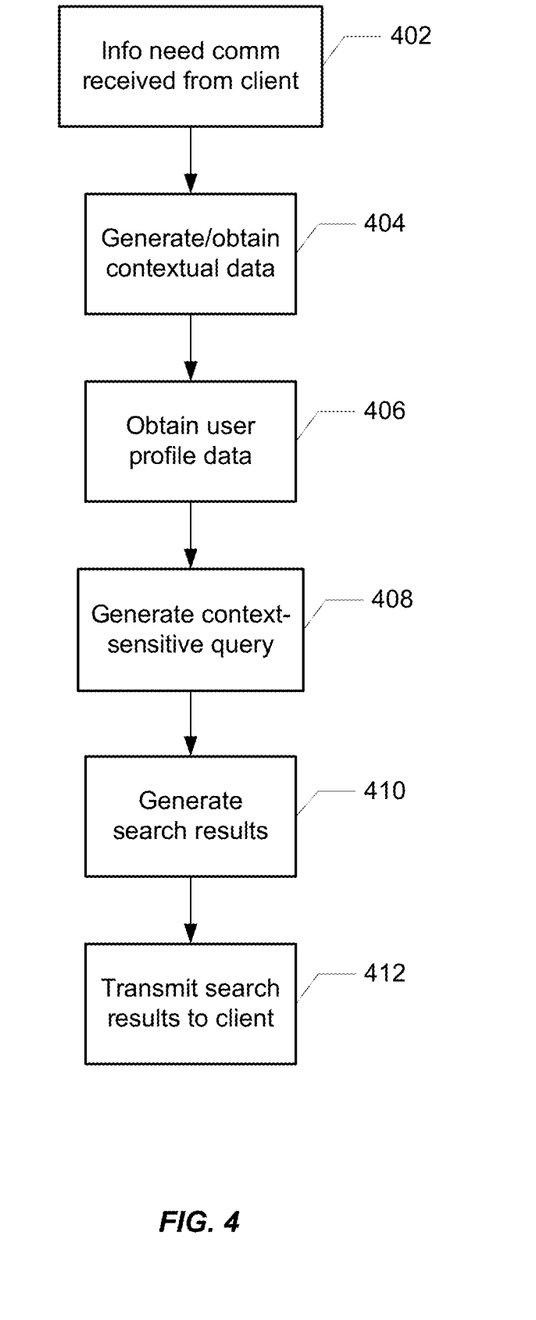
FIG. 4 is a flowchart illustrating operation of a particular implementation.

An example of the presentation of user interfaces according to a particular implementation will now be described with reference to the flowchart of FIG. 4. In the depicted example, a user has entered a query in a user interface of her mobile device. For example, the query could be "eat in half an hour" as described above with reference to FIG. 1. However, as mentioned above, the information need may be identified or derived in other ways.

When the user query (or other data representing an information need) is received from a mobile device (402), e.g., by search services platform 110, contextual data relating to the device is generated and/or obtained (404). Such contextual data may include a current location, a direction of travel, and a speed of the device. As will be appreciated by those of skill in the art, this information may be obtained leveraging existing functionalities of the mobile device using, for example, purpose-built logic on the device (e.g., module 326) which may track and transmit this information along with the query. Alternatively, this contextual data may be obtained via independent requests to the device sent by the remote platform in response to the received query.

Figure 5:
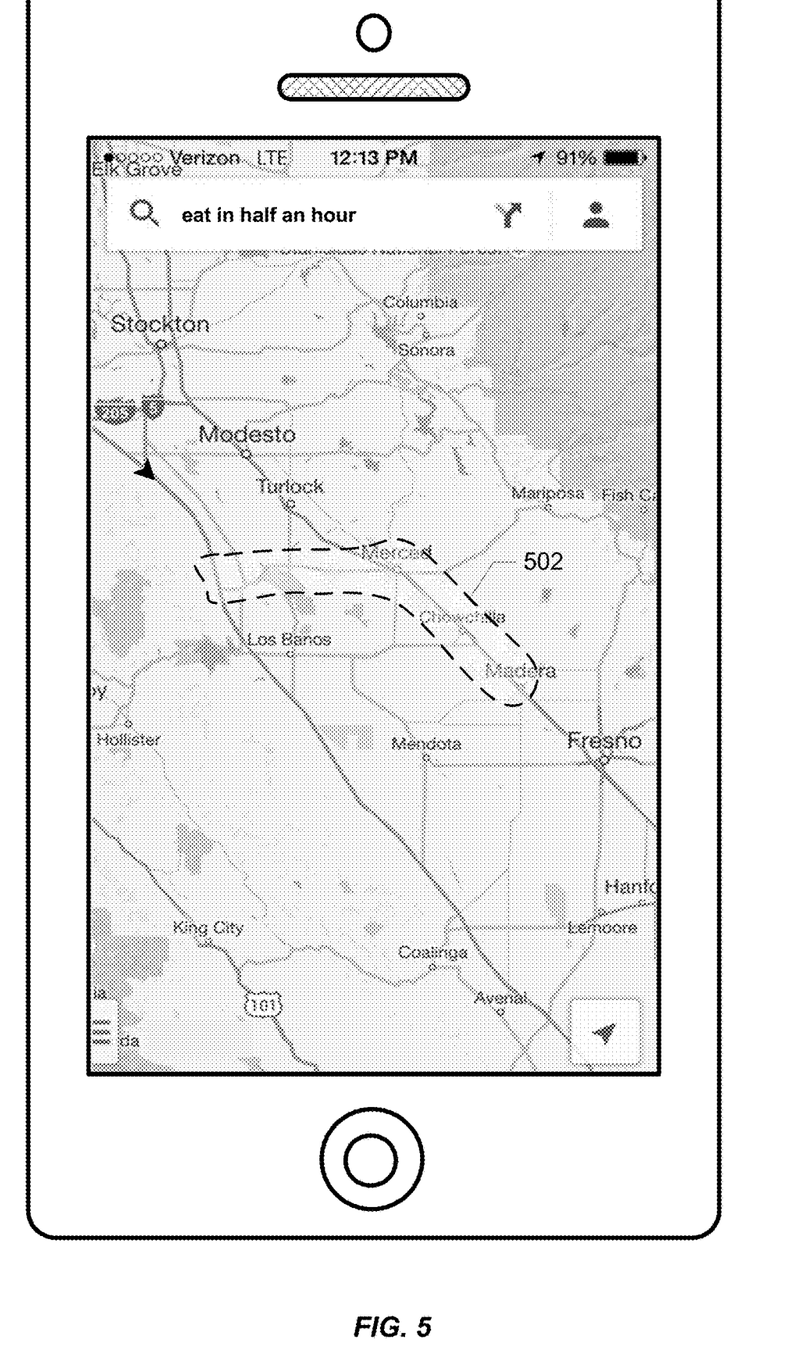
FIGS. 5-7 are additional examples of user interfaces illustrating aspects of various implementations.
Figure 6:
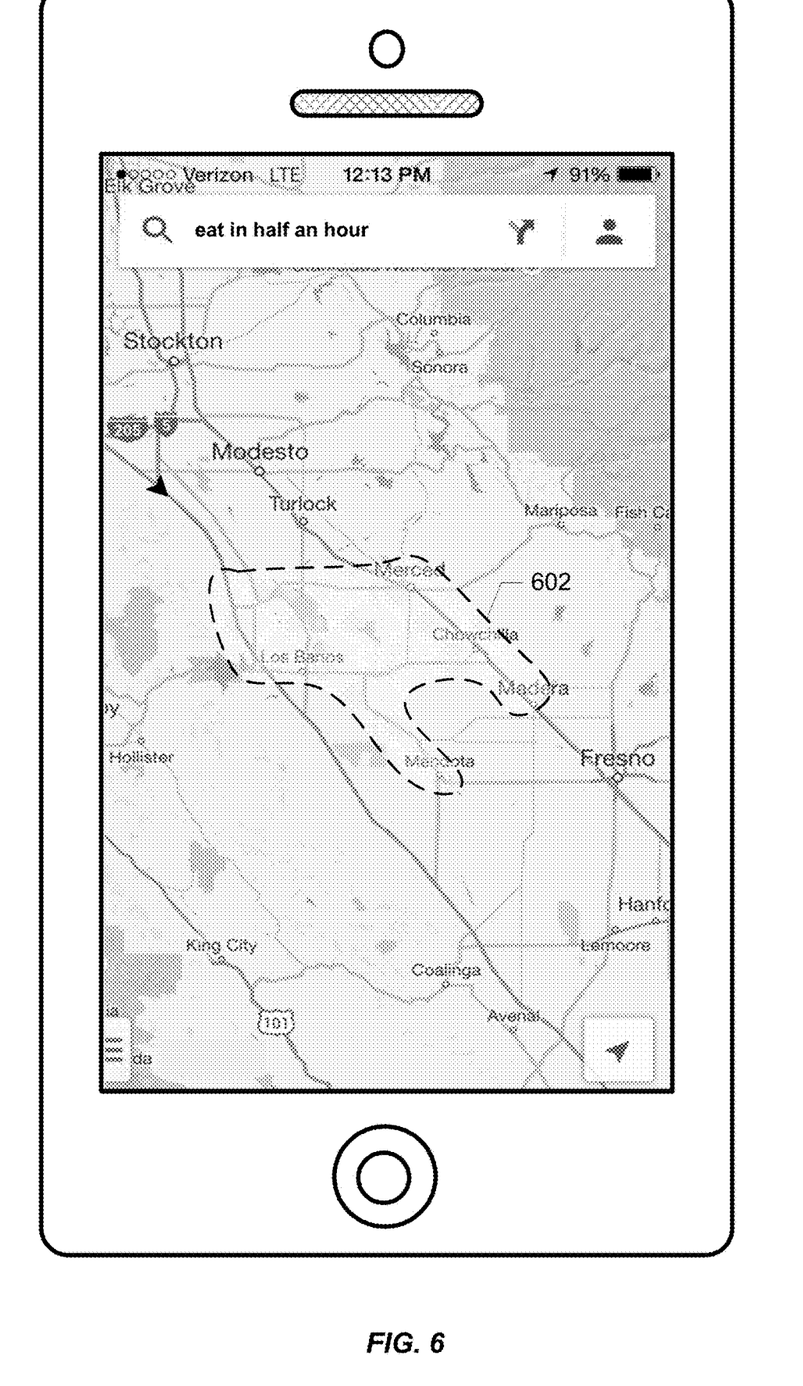

More generally, contextual data may represent any of a wide range of information that is useful in providing a context to an express or implied information need. For example, in addition to the device's current location, speed, and direction of travel, contextual data might also include a destination. The destination might be derived directly, e.g., as specified in a navigation app, or indirectly, e.g., from any of a number of data sources associated with the device or the user. Examples of the potential effect of including a destination are illustrated in FIGS. 5 and 6 in which the scenario is the same as described above with reference to FIG. 1, except that the destination is the city of Fresno. As shown in FIG. 5, search region 502 follows a particular route toward Fresno that includes a portion of California State Highway 99 including the communities of Merced, Chowchilla, and Madera. This is in contrast to search region 106 of FIG. 1 which assumes continued travel along 1-5. Further, in the example of FIG. 5, the route itself (e.g., as calculated by a navigation app on the device) might be part of the contextual data. Alternatively, if the destination is known, but not the route, the search region might look like region 602 in FIG. 6 which encompasses multiple possible routes to Fresno, now also encompassing the communities of Los Banos and Mendota. As will be appreciated, the richer the contextual data, the more potentially relevant the presented options are likely to be.

As mentioned above, contextual data represent a broad range of information and may be derived from a variety of sources. For example, in addition to geo-location and navigation data derived from the mobile device, contextual data may include information derived from messages (e.g., texts, emails, posts, calendar, etc.) associated with a device and/or user, with particular terms or concepts being extracted from the content or metadata associated with the message. Returning to the example of FIG. 1, the text of an email might include the sentence "I'll see you in LA on the afternoon of the $15^{th}$." This sentence could be parsed to determine that the likely destination of the vehicle at 12:13 pm on the $15^{th}$ is Los Angeles (and thus search region 106 rather than search region 502 would be appropriate).

Contextual information might also be derived from a calendar associated with the device. For example, a calendar item at 9 am on the $15^{th}$ might include the title "Drive to LA with Paul." Not only can the destination be understood from this calendar item, but also the fact that the user will have a companion on the drive, as well as likely locations along the likely route at various times later in that day. Including information about other people as part of the overall context of an information need can have significant effects on the information being searched. For example, suppose that available profile information about Paul indicates that he is vegan. As will be appreciated by those that have driven I-5, the options for vegan cuisine are relatively rare. As a result, search region 106 of FIG. 1 might not be large enough to identify any options. But, given the information that vegan options are required, region of search can be appropriately expanded until one or more options is identified.

Figure 7:
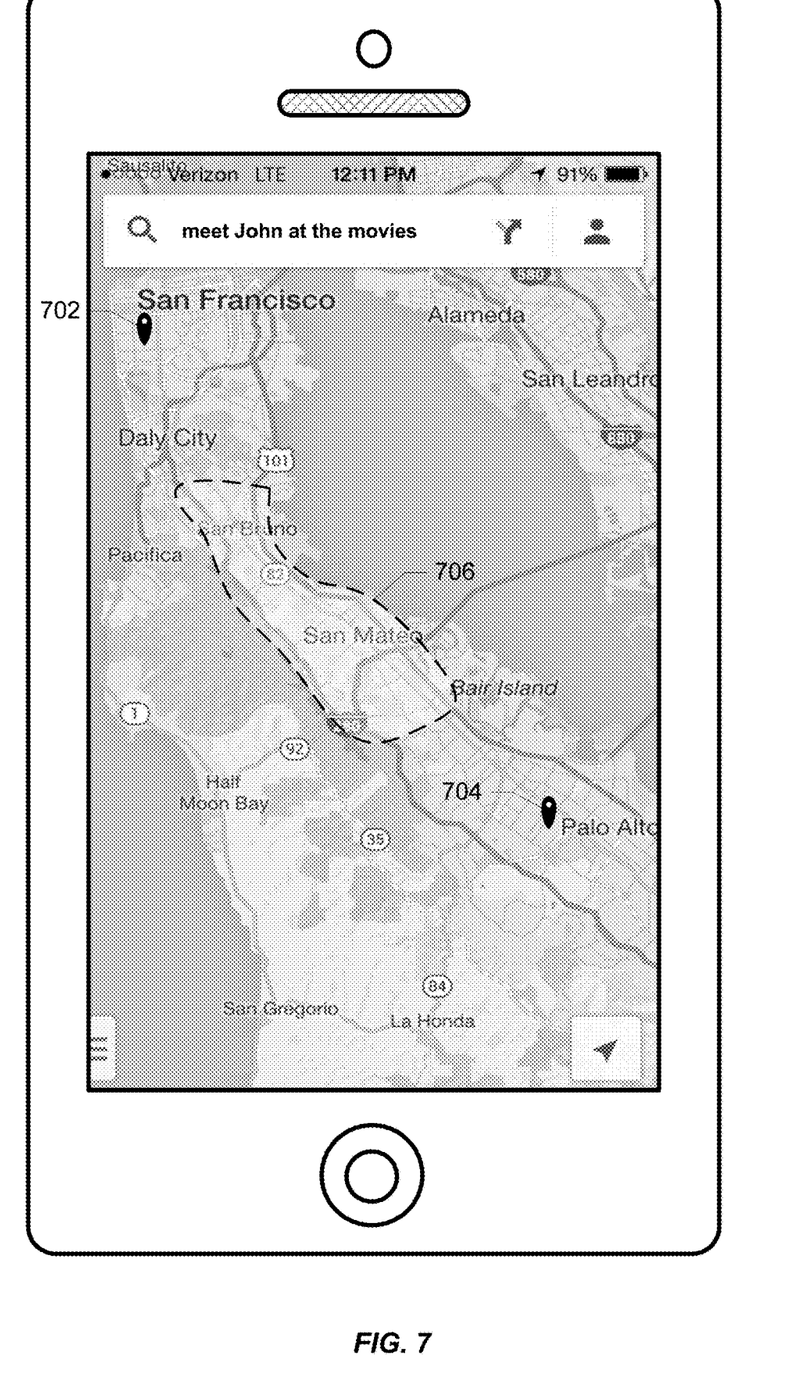

FIG. 7 illustrates an example of another way in which information about multiple people and/or their devices may be included in the context of an information need to identify relevant options. In the example shown, Paul is in San Francisco (represented by pin 702) and John is in Palo Alto (represented by pin 704). As mentioned above, these locations may be derived using existing functionalities of their respective mobile devices. In response to Paul's information need expressed by "meet John at the movies" (which might be entered directly or derived from a text, an email, or a calendar item), a query is constructed that results in a search region 706 that lies geographically between the respective locations of John and Paul.

And in addition to their locations, search region 706 may reflect a variety of other types of contextual (and possibly profile data as mentioned above and discussed below). For example and as shown in FIG. 7, the shape of search region 706 might reflect the geographical features of the area, i.e., it is unlikely that movie theaters will be located in the San Francisco Bay or the various regional parks and open spaces in the Santa Cruz Mountains.

In another important example, and as implied in some of the examples discussed above, time can be part of the contextual data. This may be the current time and date, but may also be moments in time or ranges of time in the past or the future. For example, "famous speeches during the Civil War" implies a date range from 1861 to 1865, while a calendar entry in 2016 implies a future event. Temporal limitations may also be derived from other contextual data. In the example of FIG. 7, the operating times of movie theaters and expected or actual traffic conditions can be used to adjust the region of search to only include theaters that are expected to be open during a period of time when it is reasonable to assume that both John and Paul can make it from their respective locations.

Another example of contextual data is online and offline behavior of a user including, for example, purchasing behaviors, content consumed, services accessed, sites visited, etc. For example, if John and Paul are also meeting for dinner and have radically different spending habits (e.g., Paul favors cheap fast food while John likes expensive high end cuisine), or John prefers options within walking distance while Paul doesn't mind driving, the range of options searched could be restaurants somewhere between these preferences. In another example, if it is known that a user is typically in San Francisco on Saturday afternoons, restaurant recommendations may include restaurants in San Francisco even though the query was issued in San Jose. And these recommendations might be accompanied by a message explaining the underlying assumption.

And contextual data does not necessarily need to be specific to an individual. Rather, contextual data may reflect the behavior of populations of individuals and/or more general, real-time contextual information not specifically tied to the individual (except perhaps geographically). For example, residents of the boroughs of New York City often travel to the island of Manhattan for food and entertainment. By contrast, it is comparatively rare for Manhattan residents to travel outside of Manhattan for the same diversions. Such contextual data could be used to constrain the region of search depending on the residence of the user, e.g., even if a Manhattan resident lives near a bridge, the search region might still be restricted to the island. In another example, real-time information about traffic conditions, or any of a variety of incidents (e.g., ball game or concert) that might affect decision making could be taken into account.

From the foregoing examples, it should be apparent that the types and sources of information from which contextual data may be derived are quite diverse.

Referring again to FIG. 4, profile data corresponding to the user of the mobile device (and possibly one or more others) may also be obtained (406). Such profile information may be part of a profile constructed and edited by the person it represents such as, for example, a user profile created in connection with the use of a social media app, a search services app, or any of a broad range of apps. Profile data may include, for example, various demographic information representing the person, user preferences, etc., and in some cases may be dynamic, evolving over time to account for or track a user's online behavior and express or implied preferences. In the example of FIG. 7, if it is known that Paul is interested in comedies, dramas, and westerns while John is interested in documentaries, dramas, and foreign films, this information could be used to constrain the search for dramas only. It should be noted that in some implementations profile data may be considered to be a subset of the contextual data used to generate queries, and that the explicit references herein to profile data are merely by way of another example of a specific type of information that may be part of the context of an express or implied information need.

Based on the express or implied information need (e.g., a received search query) and the contextual data (which may also include profile data), a context-sensitive search query is generated that constrains the information searched in a manner reflective of the context of the information need (408). As discussed above, this may have the effect modifying the geographic region of search as illustrated by the examples of FIGS. 1 and 5-7. For example, rather than specifying that responsive search results be within some distance radius of the device's current location, contextual data may be used to instead specify that responsive search results need to be within a specified distance of a portion of a route at some future point or range in time. In the example of FIG. 1, the current location, speed, direction of travel, and destination could be used in conjunction with the specified time (i.e., half an hour) to identify particular highway segments along the vehicle's expected path. These might include, for example, a sequence of consecutive highway segments on I-5, but also might include one or more segments of other roads or highways that branch off of I-5 (e.g., toward Los Banos). The geographic search region could then be defined as encompassing any results within some distance of any of these highway segments, resulting in the irregularly shaped region shown (e.g., region 106).

The manner in which the context-sensitive query is generated may also have the effect of modifying the region of search in other domains such as, for example, a temporal domain or a type domain. For example, a search query might be constructed that, within a particular geographic region of search, looks only for businesses that are expected to be open at a certain time. Or, based on a user's spending habits or expressed preferences, a search query might be constructed that, within a particular geographic region of search, looks only for affordable restaurants. As should be appreciated, the variety of ways in which contextual data may be used to construct queries that constrain search domains correlates with the great diversity of contextual data.

Once constructed, the context-sensitive query is processed to generate search results responsive to the information need (410). This may be done using any kind of well-known or proprietary search engine as applied to any corpus of information. The search results are then transmitted to the mobile device (412) for presentation. As will be appreciated, the ways in which the results may be displayed may vary significantly depending on the application. For example, they may be presented as a list of search results or icons on a map. Alternatively, they may be presented as recommendations in another type of interface.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A computer-implemented method, comprising:
    identifying, by one or more servers, an information need for a user of a device;
    identifying, by the one or more servers, contextual data representing a real-time context of the device, the contextual data including a current location, direction of travel, and speed of the device;
determining, by the one or more servers without human intervention, a geographical search region based, at least in part, on the current location, the direction of travel, the speed of the device in the direction of travel, and:
profile data associated with a second person associated with the user of the device, the profile data comprising at least one of information indicative of usage of one or more apps by the second person, user preferences of the second person, or online behavior of the second person; and
a message sent or received by the device;
constructing, by the one or more servers, a search query based, at least in part, on the information need and the geographical search region;
processing, by the one or more servers, the search query to generate search results responsive to the information need; and
transmitting, by the one or more servers, the search results to the device for presentation.

2. The method of claim 1, the geographical search region being constrained by the profile data associated with the second person, wherein identifying the information need includes receiving a user-generated query expressing the information need, the user-generated query indicating an identity of the second person.

3. The method of claim 1, wherein identifying the information need includes deriving the information need without receiving a user-generated search query.

4. The method of claim 1, comprising:
determining a destination of the device based, at least in part, on at least one of calendar data obtained from a calendar accessible to the device or a second message that has been sent or received by the device, and wherein the geographical search region is also constrained by one or more routes to the destination.

5. The method of claim 1, wherein the contextual data include a temporal constraint, and wherein the geographical search region is constrained by the temporal constraint.

6. The method of claim 1, wherein the profile data comprises the information indicative of the usage of the one or more apps by the second person, wherein the determining the geographical search region is based, at least in part, on the information indicative of the usage of the one or more apps by the second person.

7. The method of claim 1, wherein the profile data comprises the user preferences of the second person, wherein the determining the geographical search region is based, at least in part, on the user preferences of the second person.

8. The method of claim 1, wherein the profile data comprises the information indicative of the online behavior of the second person, wherein the determining the geographical search region is based, at least in part, on the online behavior of the second person.

9. The method of claim 1, comprising:
expanding the geographical search region until the search results responsive to the information need are identified.

10. The method of claim 1, wherein the geographical search region is constrained by a location of the second person such that the geographical search region is between the current location of the user of the device and the location of the second person.

11. A system, comprising:
memory and one or more processors operatively coupled to the memory, the one or more processors being configured to:
receive a user-generated search query from a device expressing an information need of a user of the device;
identify contextual data representing a real-time context of the device, wherein the contextual data include a current location and a direction of travel;
determine, without human intervention, a geographical search region based, at least in part, on the current location, the direction of travel, and at least one of:
profile data associated with a second person associated with the user of the device, the profile data comprising at least one of information indicative of usage of one or more apps by the second person, user preferences of the second person, or online behavior of the second person; or
a message sent or received by the device;
construct a modified search query based, at least in part, on the information need and the geographical search region;
process the modified search query to generate search results responsive to the information need; and
transmit the search results to the device for presentation.

12. The system of claim 11, wherein the one or more processors are configured to identify the information need from the user-generated search query and a subset of the contextual data.

13. The system of claim 11, wherein the contextual data comprises a speed of the device in the direction of travel, and wherein the geographical search region is constrained by the speed of the device in the direction of travel.

14. The system of claim 11, wherein the contextual data include a destination of the device, wherein the geographical search region is constrained by one or more routes to the destination, the one or more processors being configured to:
identify the destination based, at least in part, on 1) a second message sent or received by the device or 2) calendar data obtained from a calendar.

15. The system of claim 11, wherein the contextual data include a temporal constraint, and wherein the geographical search region is constrained by the temporal constraint.

16. The system of claim 15, wherein the temporal constraint implies a future location of the device, and wherein the geographical search region includes the future location.

17. The system of claim 11, the one or more processors being configured to:
identify the second person associated with the user of the device based, at least in part, on at least one of: text of the user-generated search query, calendar data obtained from a calendar accessible to the device, or a second message sent or received by the device.

18. The system of claim 11, the geographical search region being constrained by text extracted from a second message sent by the device and text extracted from a third message received by the device.

19. A computer program product comprising one or more non-transitory computer-readable media having computer program instructions stored therein, the computer program instructions being configured such that, when executed by one or more computing devices, the computer program instructions cause the one or more computing devices to:
identify an information need for a user of a device;
identify contextual data representing a real-time context of the device;

identify a second person associated with the user of the device based, at least in part, on at least one of text of at least one search query, calendar data obtained from a calendar accessible to the device, or a message sent or received by the device;

determine, without human intervention, a geographical search region based, at least in part, on the contextual data and profile data associated with the second person associated with the user of the device, the profile data comprising at least one of information indicative of usage of one or more apps by the second person, user preferences of the second person, or online behavior of the second person;

construct a search query based, at least in part, on the information need and the geographical search region;

process the search query to generate search results responsive to the information need; and transmit the search results to the device for presentation.

20. The computer program product of claim 19, the geographical search region being constrained by text extracted from a second message sent by the device and text extracted from a third message received by the device.

\* \* \* \* \*